United States Patent Office 3,428,710
Patented Feb. 18, 1969

3,428,710
SHAPED ARTICLES OF POLYAMIDE HAVING AN ANTISTATIC FINISH
Guenther Daumiller, Ziegelhausen, and Walter Lautenschlager, Ludwigshafen (Rhine), Germany, assignors to Badische Anilin- & Soda-Fabrik Aktiengesellschaft, Ludwigshafen (Rhine), Germany
No Drawing. Filed July 22, 1965, Ser. No. 474,151
Claims priority, application Germany, July 31, 1964, B 77,912
U.S. Cl. 260—857      1 Claim
Int. Cl. C08g 41/02, 41/04, 53/14

ABSTRACT OF THE DISCLOSURE

Polyamide shaped articles possessing improved antistatic properties containing as an antistatic agent a reaction product of an unmodified or isocyanate-modified polyether polyol and a polyamide.

---

The invention relates to antisatic shaped articles of high molecular weight polyamides which contain as antistatics reaction products of unmodified or isocyanate-modified polyesther polyols with polyamides having free carboxylic and/or amino groups having at least one labile hydrogen atom.

It is known that polyamides can be given an antistatic finish by the chemical incorporation therein of polyethers having terminal amino groups. It is a disadvantage of this method that the strength of the fiber is substantially decreased by the frequent interruptions of the polyamide chain by segments of a different type.

It is also known that polyamides may be mixed with polyethylene glycol to prevent electrostatic charging. The effect achieved is not permanent however because the water-soluble polyethylene glycols is washed out rather rapidly; this is disadvantageous, particularly in the case of fibers.

Furthermore, it is known that nitrogenous low molecular weight compounds, such as esters or trialkylolamines with higher aliphatic carboxylic acids, salts, of strong acids with alkylolamines whose hydroxyl groups may be esterified, or glyoxalidine derivatives, may be used as antistatics for preventing electrostatic charging of plastics.

These compounds are more or less toxic so that they can only be used for finishing plastic products which do not come into contact with foodstuffs or the human body. Material finished in this way is also often discolored and embrittled and acquires an unpleasant odor.

We have now found that shaped articles, particularly threads, filaments and fibers, of high molecular weight polyamides are advantageously provided with an antistatic finish when they contain as an antistatic a reaction product of an unmodified or isocyanate-modified polyether polyol with a polyamide having free carboxylic group and/or amino groups having at least one labile hydrogen atom.

The reaction products of the said type are advantageously used in such amounts that the antistatic polyamide contains 0.5 to 15% by weight, preferably 2 to 7% by weight, of the polyether polyol with reference to the total weight of the finished polyamide.

The polymer prepared by polymerizing ethylene oxide by a conventional method is particularly suitable as the polyether polyol. Polymers of propylene oxide and co-polymers of these oxides with other epoxides or cyclic ethers are however also suitable.

Suitable antistatics are reaction products of low molecular weight polyamides and/or high molecular weight polyamides, which contain carboxylic groups and/or amino groups having at least one labile hydrogen atom, with unmodified or isocyanate-modified polyether polyols. The term "polyamide" as used herein does not include polyoxamides. The antistatics, particularly those from low molecular weight polyamides, may be homogeneously mixed with the high molecular weight polyamides to be given an antistatic finish in molten state, preferably in extruders or kneaders. High molecular weight polyamides which have carboxylic groups and/or amino groups having at least one labile hydrogen atom may however also be reacted with an amount of unmodified or isocyanate-modified polyether polyol necessary to achieve the desired antistatic finish.

The molecular weight of the unmodified or isocyanate-modified polyether polyol (A) may be from 200 to 6000, preferably from 400 to 4000. The low molecular weight of the polyamide (B) containiing terminal carboxylic and/or primary and/or secondary amino groups (which are to be reacted with the unmodified or isocyanate-modified polyether polyols) in general is of about the same order of magnitude. Sometimes it is advantageous however for polyamides having molecular weight of up to 10,000 to be used. The molecular weights of the polycondensates or polymers from (A) and (B), which are used as antistatics, may be from about 2000 to 30,000. The polycondensates or polymers used preferably have a molecular weight of from 5,000 to 10,000.

The antistatic agents used are built up from polyester segments, polyether segments and polyamide segments. The antistatic agents are combined to the finished high molecular weight polyamide by hydrogen bonding. It is important that the polyamide segments of the antistatic agent and the finished high molecular weight polyamide should be of a similar chemical constitution. Thus for example a high molecular weight polycaprolactam has a particularly good antistatic finish when it contains as antistatic agent an esterification product of a low molecular weight polyacaprolactam containing carboxylic groups and a polyethylene glycol. The same is true for a high molecular weight polyamide from adipic acid and hexamethylene diamine in which the antistatic agent used is an esterification product whose polyamide segments are also built up from hexamethylene diammonium adipate.

The said esterification products may be prepared by conventional methods, for example by mixing equivalent amounts of a short-chain polyamide containing terminal carboxylic groups with a polyether polyol and heating the mixture under nitrogen to a temperature of more than 200° C., while stirring the mixture. The reaction may if desired be carried out in the presence of suitable catalysts, such as strong acids, for example sulfuric acid, hydrochloric acid, toluenesulfonic acid, or Lewis acid, such as boron trifluoride or aluminum chloride, and at subatmospheric pressure.

Polyester polyol radicals in the antistatic agents may also be combined via urethane and amide or urea groupings with the low molecular weight polyamides containing terminal carboxylic or amino groups. For this purpose the polyester polyols may be first reacted with a molar excess (up to about 2 moles) of diisocyanates and the isocyanate-modified polyether polyols reacted in a conventional way with the carboxylic or primary and/or secondary amino groups of the polyamides.

Reaction of high molecular weight fiber-forming polyamides which contain carboxylic and/or primary or secondary amino terminal groups with unmodified or isocyanate-modified polyether polyols may be carried out in a similar way. All fiber-forming high molecular weight polyamides, particularly nylon 6 and nylon 6,6, may be given an antistatic finish according to this invention. There is no negative influence on their strength and other important properties.

The invention is further illustrated by the following examples. The parts given in the examples are by weight.

Example 1

812 parts of a polyamide (molecular weight 1250) (obtained by reaction of a mixture of 9 moles of caprolactam and 1 mole of adipic acid by a conventional method) is heated with 585 parts of polyethylene glycol having a molecular weight of 850 and 1.4 parts of p-toluenesulfonic acid for five hours at 250° C. while passing nitrogen thereover. The material is discharged under nitrogen into a receiver, allowed to solidify and reduced in size.

5 parts thereof is homogeneously mixed in screw machine with 95 parts of a high molecular weight polycaprolactam. Plates prepared from this antistatic polycaprolactam, after having been left for one day at 60% relative humidity, have a surface resistance of $10^{10}$ ohms. A plate of polycaprolactam without the said finish which is left under the same conditions has a surface resistance of $10^{13}$. In the following table, the electric potential of filaments (length 60 cm, total titer 75,000 denier) of (a) polycaprolactam without any antistatic finish and (b) polycaprolactam which has been given an antistatic finish according to Example 1, after they have been rubbed, are compared:

Unwashed—
 (a) _____ 1000
 (b) _____ 50
Washed once—
 (a) _____ 800
 (b) _____ 0
Washed ten times—
 (a) _____ 700
 (b) _____ 0

Example 2

91 parts of freshly distilled toluylene diisocyanate and 287 parts of finely ground polyamide (prepared from a mixture of 6 parts of caprolactam and 1 part of adipic acid and having a molecular weight of 1010 and terminal acid groups) are mixed in a reactor. 420 parts of a solution of 1 part of polyethylene glycol having a molecular weight of 850 in 1 part of benzene is added to this mixture. Air and moisture are excluded by passing dry nitrogen thereover. After the reaction mixture has heated up and solidified, it is heated to the boiling point of benzene. After the benzene has been removed, the temperature is raised to 250° C. and then the melt is poured into a container flushed with nitrogen, cooled and ground.

1.2 parts of this antistatic agent is mixed in a melt with 98.8 parts of a high molecular weight polycaprolactam. Plates pressed from this mixture in the conventional way and kept for one day at a relative humidity of 40% have a surface resistance of $10^{11}$ ohms. The surface resistance of the high molecular weight polycaprolactam which does not contain an antistatic agent according to the invention is $10^{13}$ ohms.

Example 3

A mixture of 5000 parts of caprolactam, 1250 parts of water and 25 parts of adipic acid is heated in a reactor fitted with stirring means until an autogenous pressure of 18 atmospheres gauge prevails. Atmospheric pressure is then set up in the reactor and at the same time the temperature is raised to 270° C. After three hours, 280 parts of polyethylene glycol having a molecular weight of 590 is added and the mixture is kept for two hours at atmospheric pressure at 270° C. and then for one hour at the same temperature but under subatmospheric pressure. Filaments having an excellent antistatic finish are obtained from the polyamide obtained and granulated and extracted with water in the convention way (K-value 62).

We claim:
1. Thermoplastic shaped article of fiber-forming high molecular weight polyamides selected from the group consisting of polylactams, the condensation products of dicarboxylic acids and diamines or dicarboxylic acids, diamines and lactams having incorporated therein as an antistatic agent from 0.5 to 15% by weight of a reaction product obtained by heating a mixture of (A) a polyamide having (1) substantially the same recurring units as the polyamide to be shaped and (2) a molecular weight within the range of from 400 to 6000 and (3) at least one free carboxylic and/or amino group with a labile hydrogen atom with (B) a polyether polyol prepared by the polymerization of ethylene oxide and/or propylene oxide and/or the reaction product of this polyether polyol with a molar excess of up to about 2 moles of a diisocyanate and having a molecular weight within the range of from 200 to 6000 under nitrogen to a temperature of more than 200° C.

References Cited

UNITED STATES PATENTS

| | | | |
|---|---|---|---|
| 2,718,478 | 9/1955 | Fluck et al. | 117—139.5 |
| 2,835,653 | 5/1958 | Haas et al. | 260—78 |
| 2,998,295 | 8/1961 | Goldann | 260—78 |
| 3,038,885 | 6/1962 | Best | 260—78 |
| 3,249,563 | 5/1966 | Balk | 260—858 |

WILLIAM H. SHORT, *Primary Examiner.*

D. ANDERSON, *Assistant Examiner.*

U.S. Cl. X.R.

260—78, 858; 8—115.5

UNITED STATES PATENT OFFICE
CERTIFICATE OF CORRECTION

February 18, 1969

Patent No. 3,428,710

Guenther Daumiller et al.

It is certified that error appears in the above identified patent and that said Letters Patent are hereby corrected as shown below:

Column 1, line 39, "glycols" should read -- glycol --; line 61, "group" should read -- groups --. Column 2, line 25, "weight" should read -- weights --. Column 3, line 31, insert -- Volts -- as a heading at the right margin. Column 4, line 22, "article" should read -- articles --.

Signed and sealed this 21st day of April 1970.

(SEAL)
Attest:

Edward M. Fletcher, Jr.
Attesting Officer

WILLIAM E. SCHUYLER, JR.
Commissioner of Patents